United States Patent
Meissner

[15] 3,662,902
[45] May 16, 1972

[54] PALLETIZER

[72] Inventor: Konrad Emil Meissner, Lafayette, Calif.

[73] Assignee: Filper Corporation, San Ramon, Calif.

[22] Filed: Dec. 4, 1969

[21] Appl. No.: 881,978

[52] U.S. Cl. .......................................................... 214/6 FS
[51] Int. Cl. ............................................................ B65g 57/24
[58] Field of Search ............... 214/6 P, 6 FS, 6 G, 6 DK, 6 M, 214/6.5, 6 N

[56] References Cited

UNITED STATES PATENTS

| | | | |
|---|---|---|---|
| 3,431,698 | 3/1968 | Bathellier | 214/6 M UX |
| 2,524,846 | 10/1950 | Socke et al. | 214/6 FS X |
| 3,126,108 | 3/1964 | Langhart | 214/8.5 D |
| 3,178,041 | 4/1965 | Wheat | 214/6 FS X |
| 2,941,499 | 6/1960 | Gutzmer | 214/6 FS X |
| 3,326,547 | 6/1967 | Walters et al. | 214/6 FS X |
| 3,031,906 | 5/1962 | Holman | 214/6 FS X |
| 2,827,178 | 3/1958 | Pagdin | 214/6 FS X |
| 2,858,009 | 10/1958 | Bainbridge | 214/6 FS X |

Primary Examiner—Gerald M. Forlenza
Assistant Examiner—Robert J. Spar
Attorney—Boyken, Mohler, Foster & Schwab

[57] ABSTRACT

An air-actuated palletizer for cans having a vertically reciprocable platen with vacuum cup for connection with cans on a conveyor carried against a pattern forming bar over which the cans are elevated by said cups and moved to a loading position for lowering said cans onto a pallet supported stack. A system of air-actuated valves controls the movements, including a valve actuated by movement of one of the cans releasably connected with and suspended from one of said cups.

3 Claims, 16 Drawing Figures

Patented May 16, 1972

INVENTOR.
KONRAD EMIL MEISSNER
BY
Boykin, Mohler, Foster & Regan
ATTORNEYS

Patented May 16, 1972

INVENTOR.
KONRAD EMIL MEISSNER
BY
ATTORNEYS

Patented May 16, 1972

INVENTOR.
KONRAD EMIL MEISSNER
BY
Baykin, Mohler, Foster & Regan
ATTORNEYS

INVENTOR.
KONRAD EMIL MEISSNER
BY
Boyken, Mohler, Foster & Regan
ATTORNEYS

Patented May 16, 1972

INVENTOR.
KONRAD EMIL MEISSNER
BY
Boyken, Mohler, Foster & Regis
ATTORNEYS

Patented May 16, 1972

INVENTOR.
KONRAD EMIL MEISSNER
BY
Boykin, Mohler, Foster & Regan
ATTORNEYS

Patented May 16, 1972

INVENTOR.
KONRAD EMIL MEISSNER
BY
Boyken, Mohler, Foster & Regan
ATTORNEYS

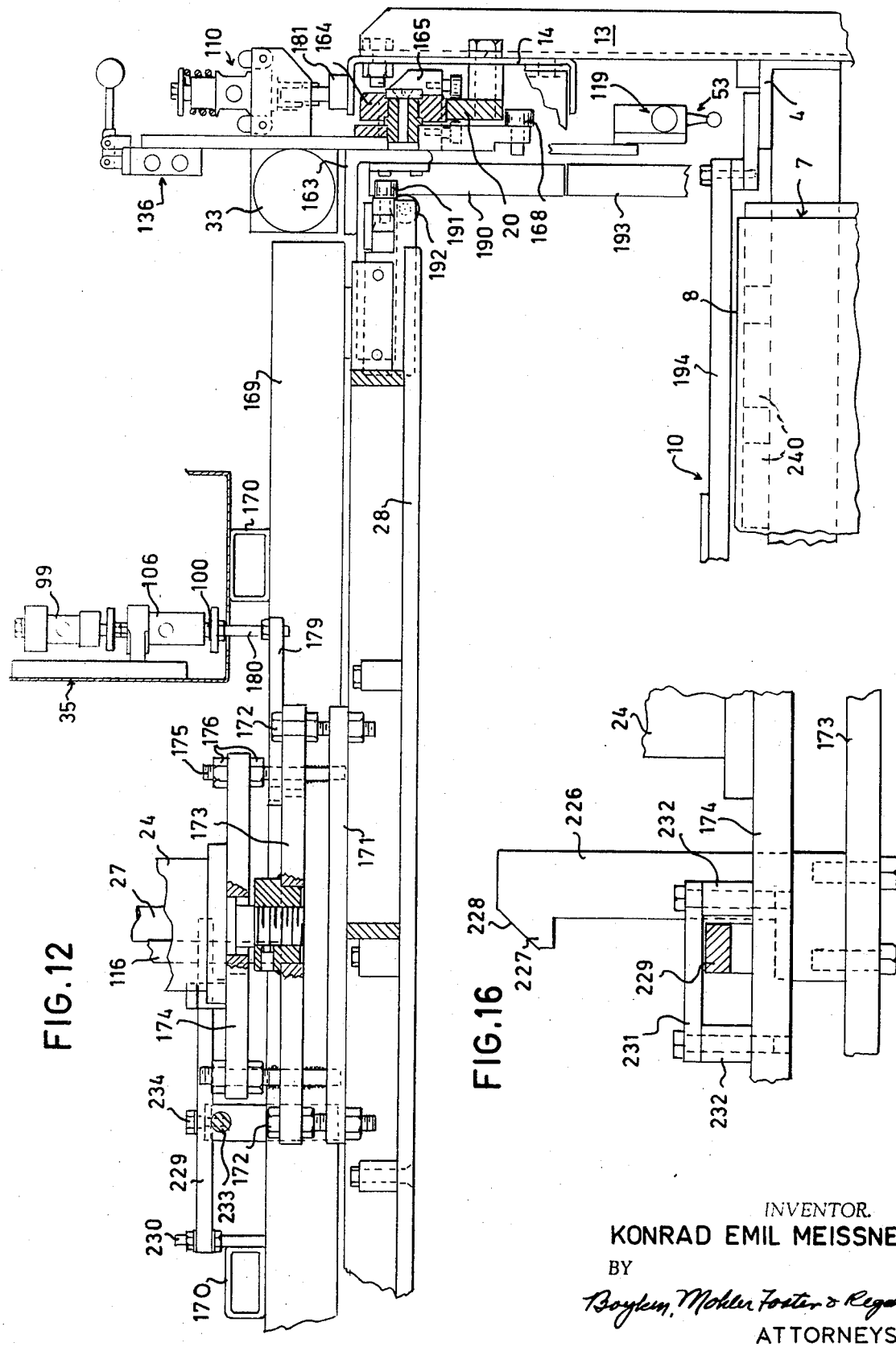

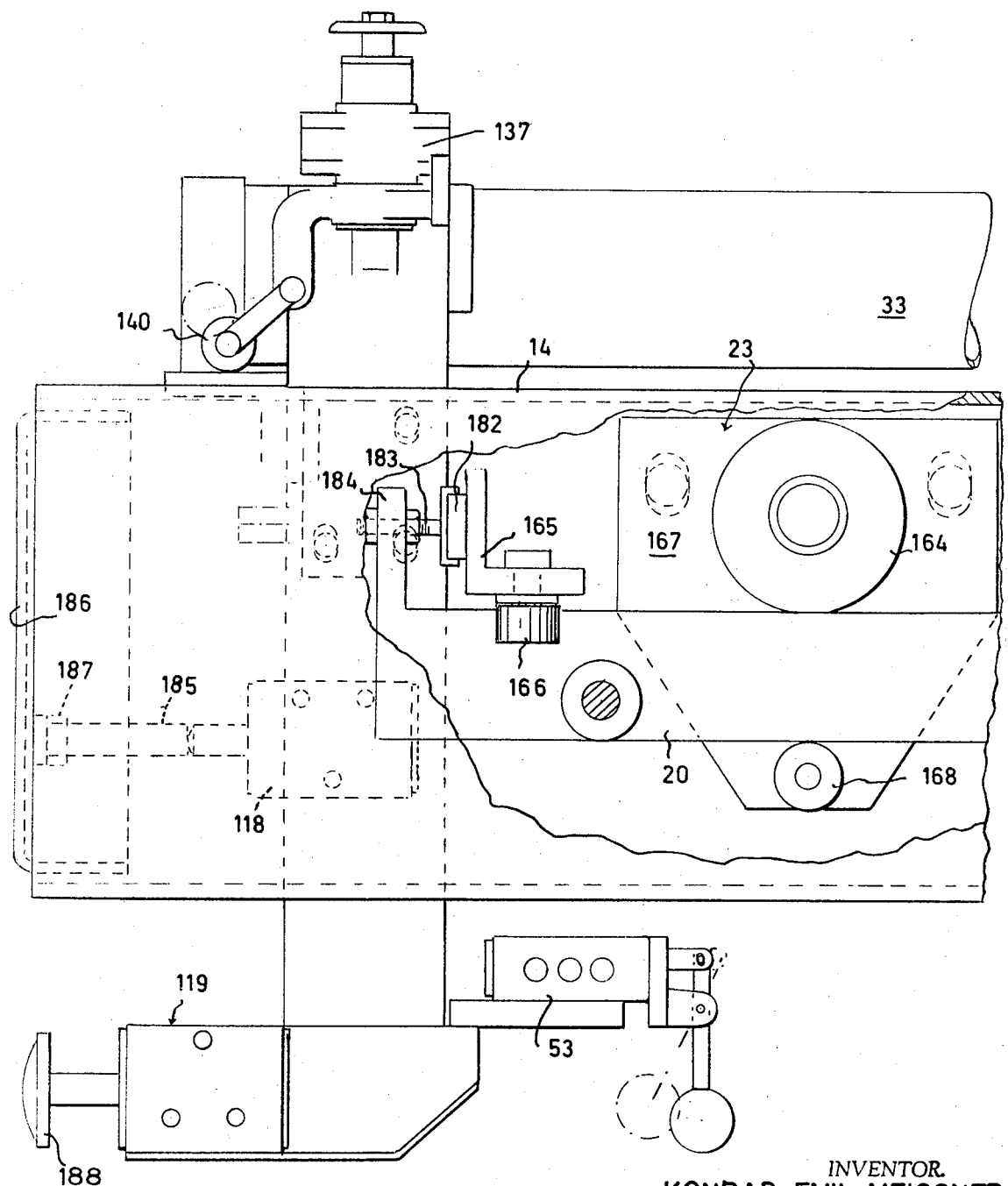

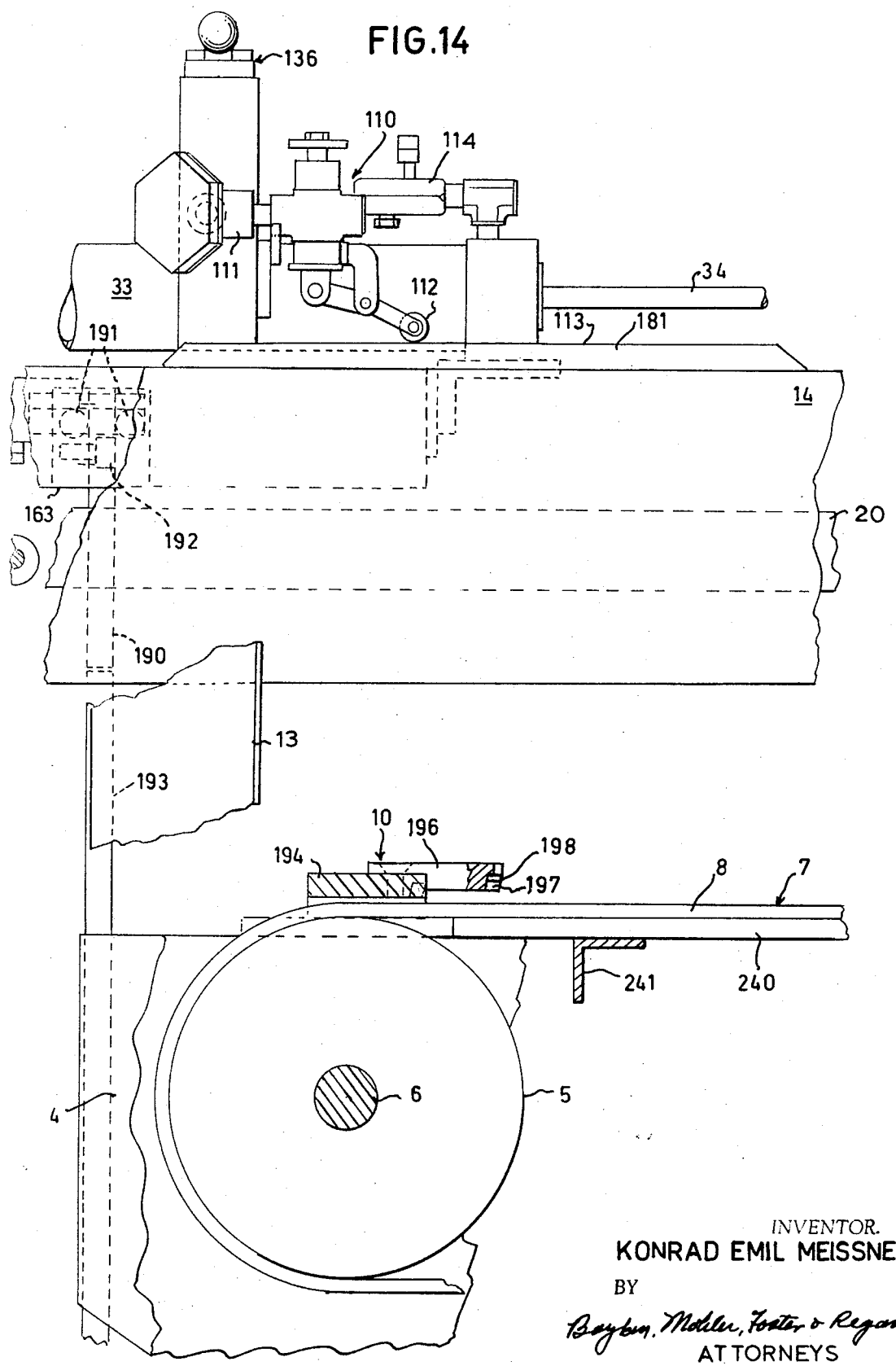

PALLETIZER

SUMMARY

The employment of vacuum cups for carrying and releasing cans in a palletizing system is old, as is the forming of cans in a predetermined pattern on a conveyor connecting the vacuum cups to the cans of such pattern.

One of the objects of the present invention is the provision of a substantially fully automatic air-actuated system in which vacuum cups are included, and in which system the different movements are approximately all air activated.

Another object of the invention is an improved arrangement of the components of the palletizer for providing a more positive and reliable palletizer.

A still further object of the invention is the provision of a can activated control means for releasing a layer of cans delivered onto a pallet or onto a layer previously deposited on such pallet.

Added objects are the provision of improved means in a palletizer for insuring against faulty operation of the palletizer, and against premature release and injury to cans, and also providing means for readily adapting the palletizer to handle different sizes of cans.

Other objects and advantages will appear in the description and drawings.

FIG. 12 is an enlarged, fragmentary, part sectional and part elevational view taken generally along line 12—12 of FIG. 1.

FIG. 13 is an enlarged fragmentary side-elevational view of the left end of the palletizer, partly broken away and in section, when the carriage is in the pallet loading position.

FIG. 14 is a fragmentary side-elevational view of a portion of the palletizer intermediate its ends, with one end of the platen indicated in dot-dash lines when the carriage is in the can pick-up position.

FIG. 16 is an enlarged fragmentary, part elevational and part sectional view taken along line 16—16 of FIG. 7.

DETAILED DESCRIPTION

Figure 1:
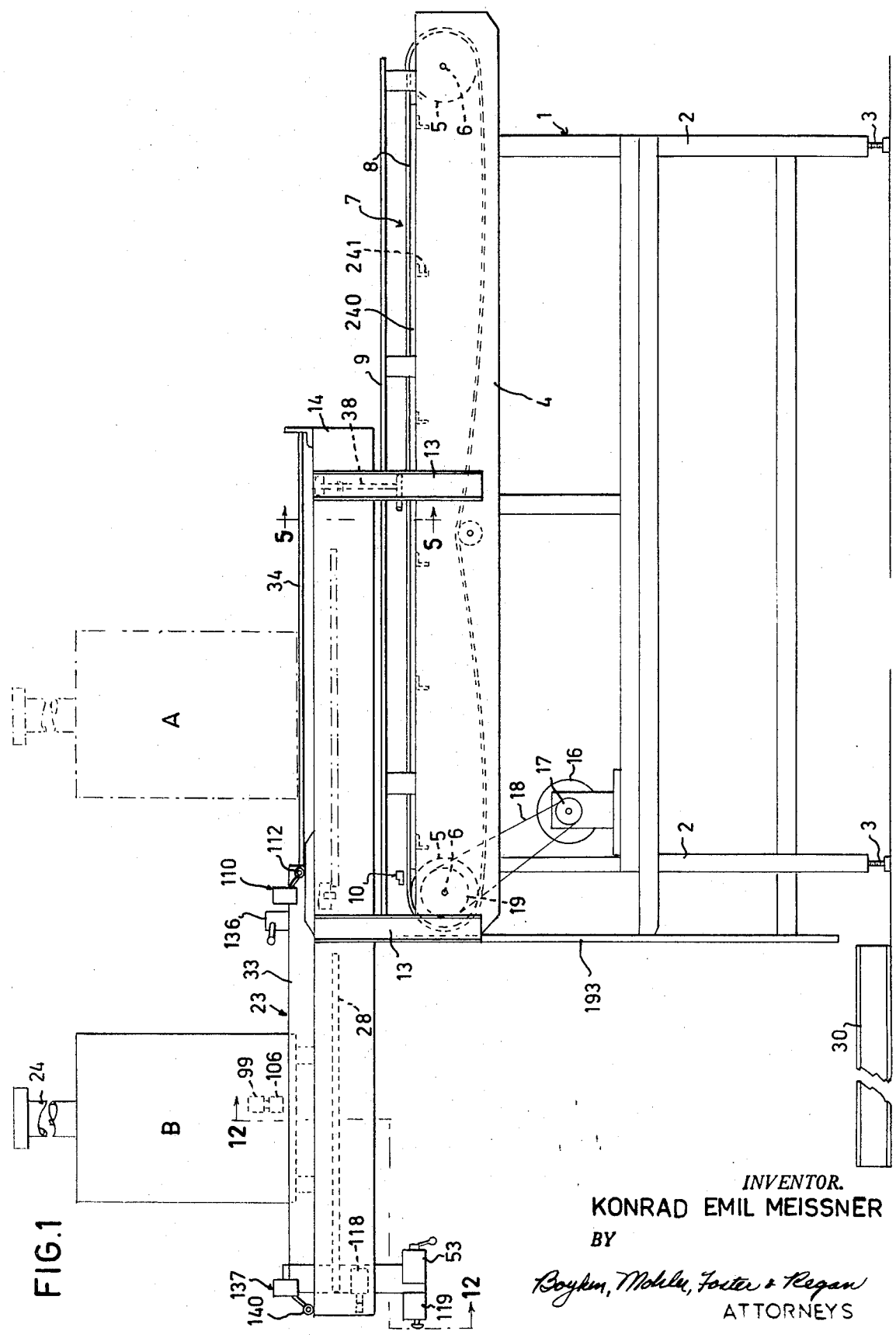
FIG. 1 is a simplified side-elevational view of the palletizer in loading position preparatory to lowering a load of cans carried thereby onto a pallet, with certain parts semi-diagrammatically illustrated. The position of the can-carrying carriage is indicated in dot-dash lines over the can conveyor on which a full layer of cans is adapted to be formed.

A rigid, horizontally-elongated frame, generally designated 1, (FIG. 1), is supported on legs 2 that, in turn, may have height-adjusting screws 3 on their lower ends for levelling the frame or adjusting its height.

Frame 1 includes a lower portion comprising a pair of horizontally-elongated side frame members 4 supported on the upper ends of said legs. Horizontal, parallel pulleys 5, extending between the forward and rear ends of said side frame members are on shafts 6, which shafts are rotatably supported in bearings carried by said side frame members, and a horizontally-extending endless conveyor 7 extends over said pulleys.

The words "forward," "forwardly," "rear" and "rearwardly" and words of similar connotation are used with reference to the direction of movement of the upper run 8 of belt 7. Said upper run moves from right to left as viewed in FIG. 1, the forward end being the left end.

Figure 15:
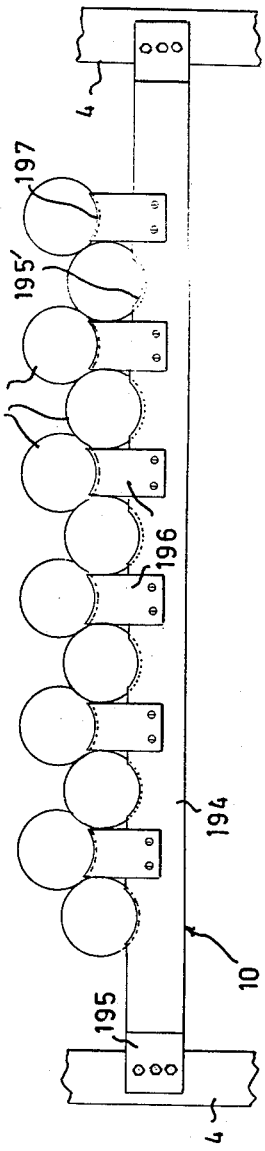
FIG. 15 is a top plan view of the pattern forming bar separate from the palletizer.

Belt 7 is preferably of the woven wire mesh type on which upright filled and closed cans will readily slide in any horizontal direction to adjust themselves to a predetermined pattern in a position between side rails 9, (FIGS. 1, 3), that are above and parallel with the opposite longitudinally-extending marginal portions of the upper run 8 of the conveyor 7, and against a pattern-forming bar 10. The bar 10, FIGS. 1, 2, & 15 extends over and adjacent to the forward end of conveyor 7 and at a right angle to rails 9.

Vertical side frame members 13 (FIGS. 1-3) secured to lower side-frame members 4 project upwardly from the latter and carry a pair of upper side frame members 14 (FIG. 1) that are spaced above and parallel with lower side frame members 13. Said upper side frame members extend from positions adjacent the forward half of conveyor 7, but spaced thereabove, to forwardly offset positions projecting forwardly relative to the forward end of conveyor 7 and the main frame 1 as indicated at 15, (FIG. 1).

A motor 16, (FIG. 1) supported on frame 1, drives a sprocket wheel 17 that, in turn, is connected by a chain 18 with a sprocket wheel 19 secured on forward shaft 6 for driving conveyor 7.

Said upper side frame members 14 have tracks 20 (FIG. 2) for supporting a horizontally-disposed rectangular carriage 23 for horizontal reciprocable movement from a pick-up station A spaced over the forward portion of the upper run 8 of conveyor 7 to a loading position B on forward extensions of tracks 20 that are on the forwardly offset portions 15 of the upper side frame members 14, and vice versa.

A vertically-disposed air cylinder 24 (FIGS. 1, 2) is rigidly secured at its lower end to carriage 23 centrally of the latter, and below said carriage and carried thereby, is a rectangular platen frame 25 (FIG. 2) that, in turn, carries vacuum cups 26 depending therefrom in a predetermined pattern with their open sides facing downwardly.

A vertical piston rod 27, (FIG. 2), secured at its lower end to the platen frame 25, as will later be described more in detail, extends upwardly into the lower end of cylinder 24, and carries a piston at its upper end within said cylinder.

Said platen frame supports a platen 28 to which said cups are attached, and which platen is formed with intercommunicating ducts respectively ported for communicating with the interiors of said cups 26 to provide for exhaust and admission of air into said cups according to whether the cups are carrying cans or are releasing cans. The lower circular ends of said cups being adapted to engage the heads of cans that are on the forward portion of conveyor 7 to carry said cans under the influence of vacuum therein, from said pick-up position A to loading position B.

The air cylinder 24 and its piston provide means for lowering the platen frame 25 and platen 28 with a load of cans 29 suspended from cups 26 from an upper position adjacent and between the offset portions 15 of upper side frame members, onto a horizontal pallet 30 (FIG. 1) or onto a previously unloaded tier of cans on said pallet, and for returning said platen and cups to an elevated position for movement back to a pick-up position A after the cans have been released from the cups and loaded onto the pallet 30.

In the present invention, all of the cups 26, with the exception of cup 26a, (FIG. 2) are directly connected with the platen 28. Cup 26a is in communication with the ducts in the platen, but is suspended for vertical reciprocation to actuate a trigger valve, as will later be described more in detail, for controlling the exhaust of air from the cups 26, 26a to release the cans from the cups when the cups are loaded onto the pallet 30, as will later be explained more in detail.

A horizontal traverse cylinder 33 is carried by and connected with carriage 23 and a plunger rod 34 extending out of its rear end is connected with the rear end of frame 1 for effecting horizontal reciprocable movement of the carriage between the pick-up station A and the loading station B.

A housing 35 is supported on the carriage 23 for movement therewith. A vacuum air line 36 and a pressure air line 37 lead to said housing, and the latter contains a plurality of air control valves, as will later be explained, that are automatically operative for controlling the air and the operation of the palletizer including the platen.

Other valves outside the housing are in the air system that is within the housing, including a manually-actuatable valve and valves actuated by the movement of the carriage 23, and by the cup 26a, as will be explained in detail.

The foregoing description is adequate for generally explaining the operating cycle of the palletizer, which is as follows.

When the platen is in the dot-dash line position in FIG. 1 at the pick-up station A at the beginning of a cycle, the platen 28 will be held on carriage 23 in a position elevated over the forward end portion of the upper run 8 of conveyor 7 and over cans 29 on said portion.

Conveyor 7 is continuously actuated, and the cans 29 will be moved against pattern forming bar 10, and will be held by said bar until a complete pattern of cans is formed that corresponds with the pattern of the vacuum cups thereover. Until such complete pattern of cups is formed, the platen 28 will not be lowered. The movement of the conveyor will crowd the cans 29 against the pattern forming bar 10 and against the side rails 9 and when the pattern is complete, one of the cans on the conveyor that is sufficiently rearwardly of the completed pattern to insure a full pattern of cans being below the platen, will move a valve-actuating arm 38 (FIGS. 1 and 5) which will actuate a valve to admit air into the upper air cylinder 24 for lowering the platen for engagement of cups 26, 26a with the cans allowing the cups to grip the cans, after which the platen is automatically elevated (with the cans attached to the cups) a sufficient distance to clear the pattern-forming bar 10. One of the cans 26, designated 26a (FIG. 2) will depend from the platen slightly below the rest of the cans due to the influence of gravity aided by a spring, as will later be described more in detail.

After the platen is elevated, as above described, the transverse cylinder 33 is actuated to move the carriage 23 and the platen 28 with the load of cans suspended below the latter to the loading station B.

At station B, further movement of the cans ceases to enable an operator to place a cardboard or paper separator onto one or more tiers of cans previously deposited on the pallet 30, after which the operator manually actuates a push button to actuate a valve in the air system, for causing the platen 28 to be lowered. The platen then moves down under the control of air in cylinder 24 until the can 26a engages the pallet, or a can of a previously deposited layer of cans on said pallet, effecting actuation of a valve for releasing the load of cans.

After the cans have been released, the platen automatically moves back to its elevated position and from thence to the pick-up station A. If a full pattern of cans is on conveyor 7 by the time the platen returns to the pick-up station, the cycle will automatically commence immediately.

Figure 4:
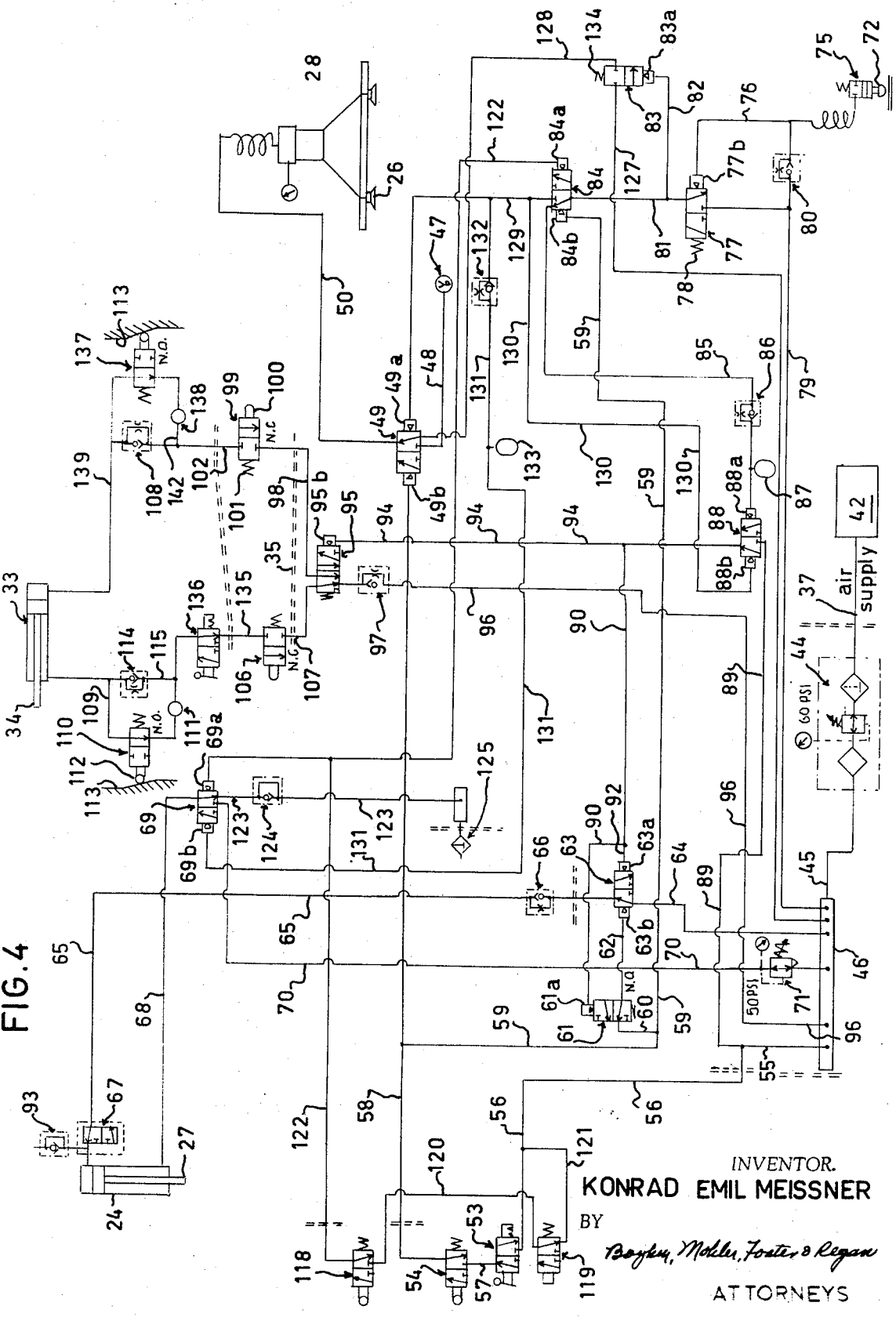
FIG. 4 is a schematic view of the system.

Referring to the diagrammatic chart of FIG. 4, the symbols used are those adopted by the United States of America Standards Institute (USASI) in Dec., 1966. The valves outside the housing 35 will be indicated by the same numerals in other views.

As shown in the diagram, any suitable source 42, of air under pressure, is connected by pressure line 37 with a filter-pressure-regulator-lubricating unit 44 for maintaining a uniform pressure of say approximately 60 p.s.i. in a manifold 46 that, in turn, is connected with said unit 44.

A vacuum pump 47 is connected by a vacuum line 48 with a two-position air pilot actuated valve 49 in housing 35, and another line 50 connects valve 49 with the ducts in platen 28, and consequently with vacuum cups 26, 26a.

It is to be understood that the diagram is illustrative of the system in one position in which the manually-actuatable starting valve 53, which is on the forward end of the carriage 23, is in a closed position, and when moved to closed position the various other valves are automatically actuated or actuatable, as described hereafter.

When the platen 28 is in position A, a manually-actuatable starting valve 53 outside housing 35 in any suitable location on carriage 23 is detent-held in either an "on" position or an "off" position. It is shown in FIG. 4 in an "off" position.

For operation of the machine, the conveyor motor 16, vacuum pump 47 and the air supply to the manifold 46 must be operating, and the valve 53 must be in the "ON" position. The conveyor motor and vacuum pump and air supply to the manifold are continuously operating but when valve 53 is closed, the cycle will not start.

Upon completion of the full layer at station A the lever arm 38 (FIGS. 1, 3 and 5) will be actuated by engagement with a can on conveyor 7 to move a valve 54 (FIGS. 3 and 5) from closed to open position, thereby connecting air under pressure from manifold 46 through lines 55, 56, valve 53, line 57 and valve 54 with a line 58 that, in turn, leads to three places, as follows:

1. through a line 58 to the air pilot 49b of vacuum valve 49, activate valve 49 to connect line 48 from vacuum pump 47 with line 50 that connects with the platen 28 and vacuum cups 26, 26a.
2. through line 59, which is connected with line 58, to a branch line 60 that leads to a normally open air and spring controlled pilot valve 61, and through said valve 61 to line 62 that connects with the air pilot 63b of an air pilot controlled valve 63. Valve 63 will now be moved to the position shown in FIG. 4, in which it connects an air line 64 from manifold 46 with a line 65. Line 65 has a flow control valve 66 therein, and from said valve the air in line 65 passes through a quick exhaust valve 67 into the upper end of the air cylinder 24 from the depending rod 27 of which cylinder 24, the platen 28 is carried.
A line 68 connects the lower end of cylinder 24 with an air pilot controlled valve 69. When air under 60 p.s.i. is introduced into the upper end of cylinder 24, air at 50 p.s.i. is in the lower end of said cylinder, said lower end being in communication with manifold 46 through a line 70 having a pressure regulator 71 therein. The pressure differential in the cylinder effects downward movement of the piston rod 27 and the platen 28 until the cups on the platen are fully seated on the cans 29. The flow control valve 66 is set to obtain a slow descent of the platen.
3. through line 59 to pilot 84b of an air pilot controlled valve 84 to set the valve 84 for the next cycle.

Figure 10:
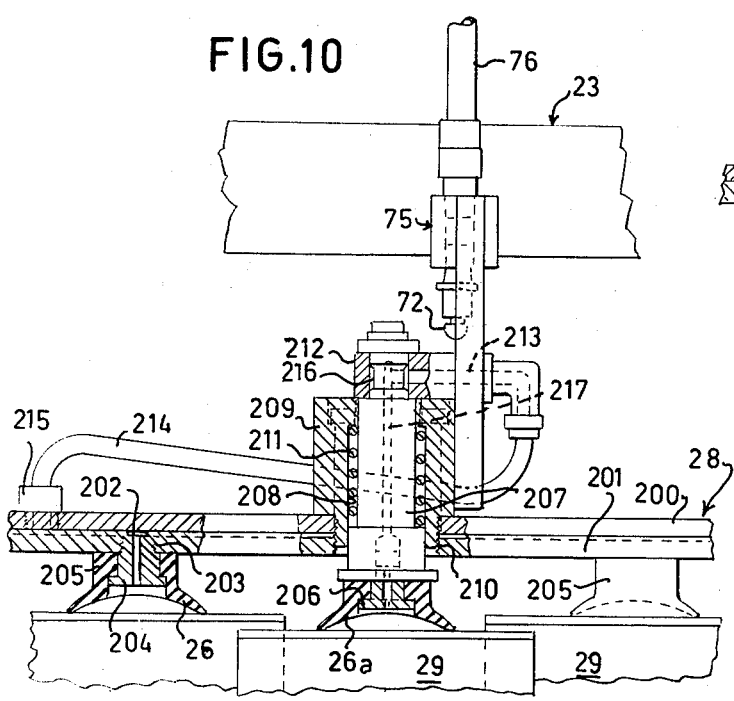
FIG. 10 is an enlarged fragmentary part sectional and part elevational view along line 10—10 of FIG. 9.

The vacuum cup 26a on platen 28, as already mentioned, depends a short distance below the other cups 26, (FIG. 10) which may be about ¼ inch, when the cups 26a and 26 are spaced above the cans 29, and in this position a vertically reciprocable stem 207 will be moved upwardly upon cup 26a being fully seated on a can 29 to actuate a valve 75 (FIG. 10) for moving the latter from a normally closed position to an open position for exhausting air from line 76 that connects valve 75 with air pilot 77b of a spring-pilot controlled valve 77.

A line 79 connects with line 76 at a point between valve 75 and valve 77, which line 79 extends to manifold 46, and a flow control valve 80 in line 79 regulates the flow of air from manifold 46 to the pilot line 76. As long as the trigger 72 is depressed by the pressure of cup 26a on a can, air will bleed out of pilot line 76 and the spring 78 of valve 77 will keep valve 77 in its end position. The small amount of air that passes through flow control valve 80, exhausts through valve 75.

When valve 77 is moved to its end position under the influence of spring 78 and by the bleeding of air out of air pilot 77b, air from the manifold 46 will pass through valve 77 and from valve 77 through lines 81, 82 to the pilot 83a of spring-air pilot controlled normally closed valve 83, and through line 81 to an air pilot controlled valve 84, which valve 84 was previously set to allow air to pass from line 81 and valve 84 to a line 85 having a flow control valve 86 therein.

Air passes through flow control valve 86 into an accumulator 87 and to pilot 88a of an air pilot control valve 88, opening the latter. The control valve 86 and the accumulator 87 serve as a time delay to slow down signal to pilot 88a of valve 88. This is required to allow the vacuum cups to get a good grip on the cans before they are lifted by the platen. As valve 88 must open before the platen can rise, as will hereinafter appear, the time delay on pilot 88a of valve 88 will also delay lifting of the cans, as desired. The right amount of delay is obtained by adjusting the air flow through valve 86.

When valve 88 is opened, air from manifold 46 will pass through line 89 that connects valve 88 with said manifold, to and through valve 88 to three places, as follows:

1. through line 90 to the air pilot 61a of a normally open spring-pilot controlled valve 61, closing the latter to passage of air therethrough to pilot 63b, permitting exhaust of air from the latter,
2. to pilot 63a of valve 63 through a line 92 connected with line 90 actuating valve 63 to exhaust line 65 to the upper end of the platen-lifting cylinder 24, thereby permitting the exhaust of air from the upper end of the lift cylinder 24 through quick exhaust valve 67 and flow control valve 93.

The air at 50 p.s.i. in the lower end of cylinder 24 now lifts platen 28 and the full layer of cans to the upper end of its movement at which end the lower ends of the cans are sufficiently elevated (approximately 2 inches) to clear the pattern forming bar 10 when the load of cans is moved from station A to station B.
3. through line 94 to the air pilot 95b of a spring-pilot controlled valve 95.

Figure 2:
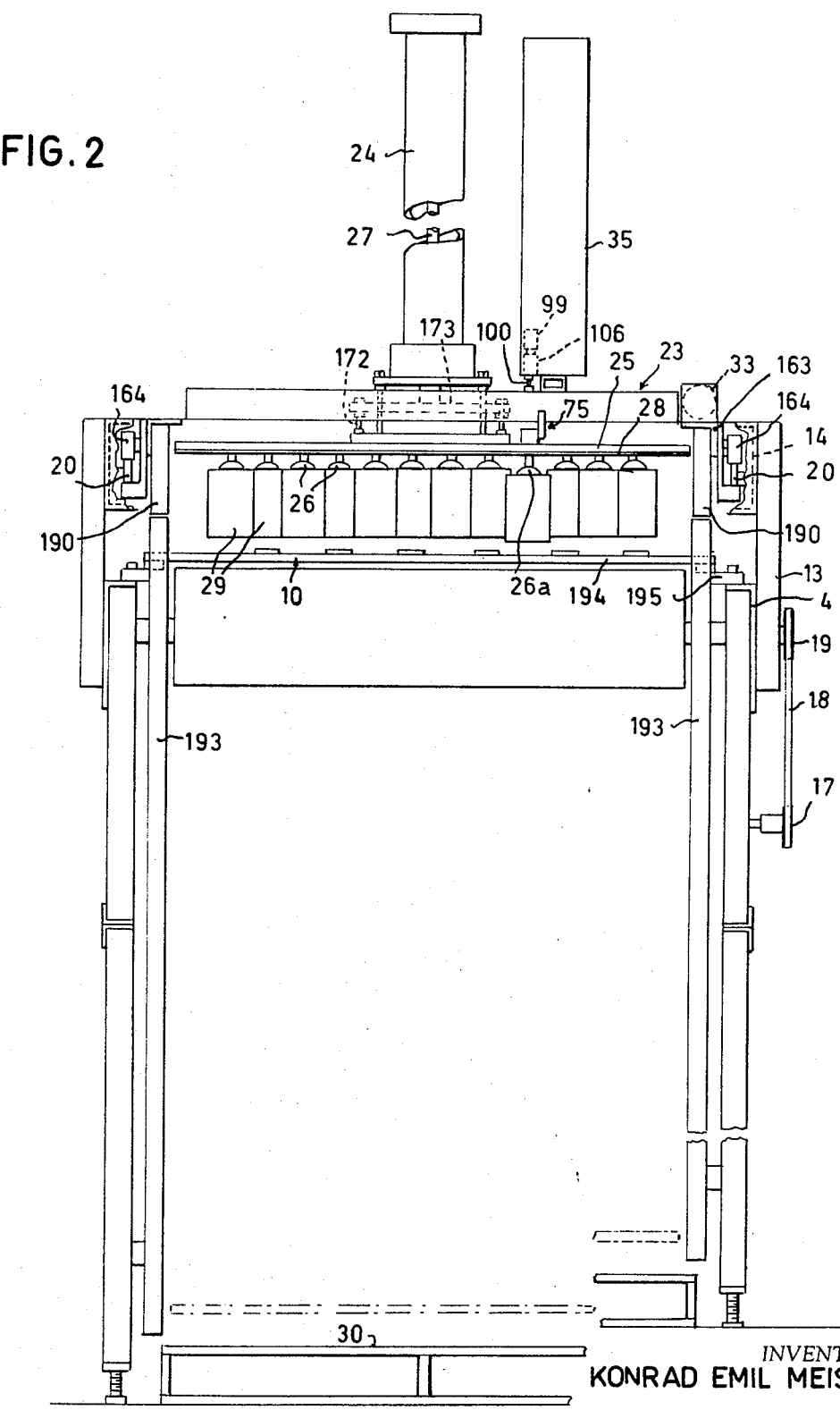
FIG. 2 is an end view of FIG. 1 from the left end as viewed in FIG. 1 with certain parts simplified, omitted, and broken away for clarity.

The actuation of valve 95 by air to pilot 95b permits air from manifold 46 to pass through a line 96 and a flow control valve 97 therein, to and through valve 95 to a line 98 that connects with a normally closed mechanically actuatable valve 99, (FIG. 2).

As soon as the platen 28 reaches the upper end of its upward movement it engages the valve stem 100 of said valve 99 opening the valve against the resistance of spring 101. When valve 99 is so opened the air from the manifold will pass from line 98 through valve 99 to line 102 and into the rear end of the traverse cylinder 33, but until the platen 28 reaches the upper end of its upward movement, valve 99 will remain closed.

When the cans are lifted from the conveyor 7 by elevation of the platen, the can 29a will hang at a level below that of the other cans, whereby the stem 207 will be moved downward away from the trigger stem 72 of valve 75, with the result that valve 75 will close automatically. The pressure of air in line 76 and against air pilot 77b will then build up through flow control valve 80 until valve 77 is moved against the resistance of spring 78 to close valve 77 to passage of air therethrough from the manifold 46 and air from pilot 83a of valve 83 as well as from pilot 88a of valve 88 will exhaust through valve 77.

At the same time normally closed valve 99 is opened and as soon as platen 28 reaches the upper end of its movement with the full load of cans depending therefrom, normally closed mechanically-actuated valve 106, (FIG. 2) will also be opened by said platen. Valve 106 is connected by line 107 with valve 95.

A flow control valve 108 is in line 102 leading to the rear end of the traverse cylinder from valve 99 and when valve 99 is opened at the upper end of its movement, air passing through line 102 from valve 99 will pass freely through said control valve 108 and into the rear end of the traverse cylinder 33 to move its rod 34 and the platen from station A to the loading position at station B.

The air in the forward end of traverse cylinder 33 will exhaust through line 109 and a normally open cushion valve 110 and then through a quick exhaust valve 11 to the atmosphere as the platen is being moved by the traverse rod 34 to station B.

Approximately 6 inches before platen 28 reaches station B, the valve 110 will be closed by a cam follower 112 connected with valve 110 moving onto an elevated cam track 113 (FIG. 1) carried by one of the upper side frame members 8, thereby compelling the exhaust air to pass through a flow control valve 114 that is set to restrict the rate of exhaust, and to slow down the movement of the platen just prior to it reaching station B.

It is important that the traverse motion of the platen cannot occur under the influence of air from the manifold 46 until both of the platen actuated valves 99, 106 are actuated by the platen at the upper end of its movement.

To insure against downward movement of the platen until it reaches station B a normally closed stop valve 118 is provided, which valve is connected by a line 120 with a manually-actuated valve 119 positioned on the platen carriage 23 (FIGS. 1, and 13).

Valve 118 is actuated by the platen upon the latter reaching station B at the end of its traverse movement, (FIG. 1).

Manually-actuatable valve 119 is connected by line 121 with air pressure line 56 that, in turn, is connected with manifold 46. Until valve 119 is manually actuated, no air from the manifold 46 will pass to valve 118, and valve 118 will remain closed until the platen is at the end of its movement to position B; hence, the platen will remain elevated until valve 119 is manually actuated.

The period of time between the arrival of the platen 28 and its load of cans at station B and the manual actuation of valve 119 to effect lowering of the cans, is employed by the operator in placing a sheet of cardboard over a layer of cans previously loaded onto a pallet, or in removing a loaded pallet and replacing it with an empty one.

Upon manual actuation of valve 119, as by pressing a button on the latter, the air from manifold 46 will pass through valve 119, line 120 and valve 118 to line 122, and to pilot 84a of valve 84 and to pilot 69a of valve 69.

Air in the portion of line 122 connecting with pilot 84a functions to reset valve 84b for the next part of the cycle. During the previous part of the cycle air through valve 84 shifted valve 88 that has heretofore been open to permit passage of air from manifold 46 to pilot 95b in turn opening valve 95 to passage of air to the rear end of traverse cylinder 33.

The air in the portion of line 122 connecting with pilot 69a of valve 69 actuates the latter to connect line 68, which leads to the lower end of the lifting cylinder 24, with exhaust line 123 in which a flow control valve 124 is positioned to control the rate of exhaust, and said exhaust air then passes through an exhaust filter 125 to the atmosphere.

The weight of the cans and platen forces the exhaust of air from within the lower end of cylinder 24, and the rate of descent of the platen and the cans carried thereby must be controlled very closely to prevent hard impact when the cans engage the pallet or the cardboard sheet on a layer of cans previously deposited on the pallet. This control is accomplished by proper adjustment of control valves 93 and 124. Valve 124 restricts the flow of the exhausting air and valve 93 restricts the flow of incoming air into the upper end of cylinder 24, with these two control valves, the desired speed of descent of the platen 28 and its load of cans may be obtained for heavy or light cans.

During the traverse and descent of the platen 28 and its load, the control can 29a carried by the vertically reciprocably supported cup 26a will be suspended in a position slightly lower than the remaining cans 26, which may be approximately a ¼ of an inch lower. When the descending platen reaches approximately the lower end of its downward movement, can 29a will be the first to engage the separator sheet on a previously deposited layer of cans, or the pallet, and cup 26a from which can 29a is suspended includes stem 207, which stem will move upwardly, while the remaining cans 26 are lowered to seat themselves to engage valve trigger 72 of valve 75 to open said valve to air from manifold 46 as air bleeds out of the pilot 77b of valve 77 through valve 75.

Upon the exhausting of air from air pilot 77b of valve 77, spring 78 shifts valve 77, and air from the manifold 46 may pass through valve 77 to the following four places:

1. through line 82 to pilot 83a of valve 83 thereby permitting air from manifold 46 to pass through line 127 to and through valve 83 to line 128 that is connected with vacuum valve 49, but this air will not, as yet, pass through valve 49;

2. through line 81 to and through valve 84 and from valve 84 through line 129 to pilot 49a of valve 49, with the result of closing valve 49 to the vacuum pump 47 and opening valve 49 to passage of air under pressure through line 50 to the vacuum cups 26, 26a, thereby providing a blast of air into the cups to prevent the cans from clinging to the cups when the platen is lifted to its elevated position at station B;

3. through line 81 to and through valve 84 to line 130, which line 130 is connected with line 129, and through line 130 to pilot 88b of valve 88. This will exhaust the air in pilot line 94 from pilot 95b of valve 95. Also, air will be exhausted from pilot 63a of valve 63 through line 90 and from pilot 61a. Valve 95 is now reversed to allow air from manifold 46 to pass from line 96 to the normally closed valve 106. Valve 61, in turn, is now in its normally open position for passage of air to pilot 63b of valve 63 for the next cycle, although there is no such passage of air at this time. Thus, valve 61 is set for picking up cans during the next cycle;

4. through valve 84 and line 129 to line 131 that connects with pilot 69b of valve 69. A control valve 132 and an accumulator 133 in line 131 function to slow down the signal to pilot 69b. This delayed action of valve 69, through which valve air is now passing from manifold 46 through lines 70 and 68 into the lower end of cylinder 24, allows the cups 26, 26a to loosen their grip on cans 27, 27a before the platen starts its upward movement.

The valve 69, when fully open to passage of air through line 68 into the lower end of cylinder 24, lifts the platen 28 and the cups 26, 26a to the upper end of its travel under pressure of approximately 50 p.s.i., leaving the layer of cans on the cardboard separator positioned on a previously deposited layer of cans on pallet 30, or on the pallet.

Upon the upward movement of the platen after the cans carried thereby have been loaded on pallet 30, the stem 72 of valve 75 that is carried by the platen 28 or its frame will drop, closing valve 75 and allowing air to accumulate in pilot line 76 that is between valves 77, 75, until air in pilot line 76 overcomes the force of springs 78 and valve 77 shifts. By shifting of valve 77 the air in pilot lines 82, 129, 130, 131, respectively connected with pilots 83a, 49a, 88b, and 69b of valves 83, 49, 88 and 69 will exhaust through valve 77, and at this point the air blast through valves 83 and 49 is shut off by movement of valve 83 under the influence of spring 134 of the latter.

When the platen 28 reaches the upper end of its movement, the normally closed valves 99, 106 are actuated by the platen to open them to allow air from manifold 46 to pass air from line 96 through flow control valve 97, valves 95, 106, line 135, through a normally open manually actuated valve 136 and through line 115 to flow control valve 114 and into the forward end of the traverse cylinder 33 for moving the platen back to station A.

Air in the rear end of cylinder 33 will be exhausted to the atmosphere through a normally open, mechanically actuatable valve 137 and a quick exhaust valve 138. A line 139 connects the rear of cylinder 33 with valve 137, by-passing the flow control valve 108 through which air had been admitted into the rear end of cylinder 33 to move platen 28 from station A to station B. Valve 137 is similar to valve 110, being carried by carriage 23 and having a cam follower 140 that rides on a stationary cam track 113 that in turn is on one of the upper side frame members 14 of the machine.

Toward the end of movement of the carriage 23 from station B to station A, the valve 137 is closed under the influence of movement of follower 140 on track 113 to force the air in the rear end of cylinder 33 to exhaust through flow control valve 108 and line 142 that connects with the exhaust valve 138.

When the carriage 23 and platen 28 reach station A, the next cycle will be automatically repeated with the exception of the actuation of manually-actuatable valve 119, but only if a sufficient number of cans has accumulated on conveyor 7 against the pattern forming bar 10 to form a complete layer for moving actuating arm 38. Valve 54 is located on platen carriage 23 and will be opened by valve actuating bar arm as soon as carriage 23 reaches the end of its return motion at Station A.

If a full layer of cans has not been accumulated against the pattern forming bar 10, the carriage 23 and platen 28 will remain elevated at station A until valve 54 is actuated by the cans of a full layer, and then the cycle will commence.

It should be noted that the carriage 23 and platen 28 will be held stationary against the forward and rear end stops by air pressure in cylinder 33 at all times, except during traverse movement of the carriage, and during the up and down movements of the platen at the pick-up station A and the loading station B, the valves 106 and 99 are closed. Thus the air in the traverse cylinder 33 is closed in to prevent accidental traverse movement of the platen carriage during the up and down movements of the platen.

The valve 136 is adapted to be manually actuated, which valve is provided in line 135 between normally closed valve 106 and the lines leading to the rear end of cylinder 33 to enable an operator to manually move the carriage 23 between stations A and B for inspecting the can pattern or to check the vacuum cups. When manually actuated for movement to close line 135 it will open the line 109 to exhaust air in the forward end of the cylinder for permitting said manual movement.

The foregoing arrangement provides for an air-actuated system independent of electric solenoids, relays, etc. Also, means is provided for varying the rate of movement of the platen at the ends of its traverse movement and its movement when engaging the cans and releasing them to preclude injury to the cans or their disarrangement and when connected with the cups. This control of the platen during its vertical movement at the loading station to enable accurate control of the rate of descent so as to gently load the cans onto the pallet or the caps on the pallet is important.

The feature of all steps being automatic only when the pattern of cans for a full platen is complete at the can pick-up station, except the lowering of the platen at the loading station, is highly desirable, as is the feature of enabling manual control of movement between the pick-up and loading station, and other features appearing in the description and drawings.

Figure 5:
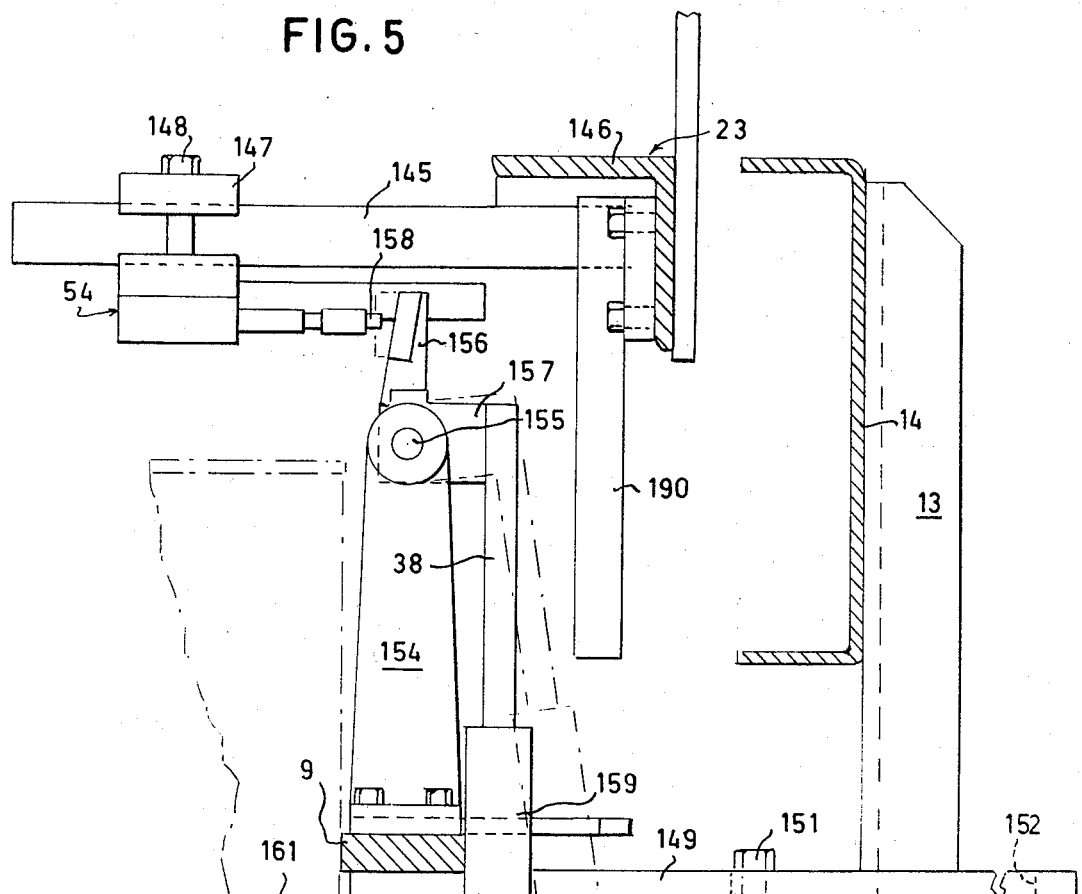
FIG. 5 is an enlarged, fragmentary, cross-sectional view taken along line 5—5 of FIG. 1.

Referring to FIG. 5, the valve 54 that is actuated by the cans upon a full load or layer being formed on the belt 8 at station A (FIG. 1) is adjustably supported on a horizontal bar 145, which bar is bolted to one of the side frame members 146 of the carriage 23. This valve, in itself, is conventional and is adapted to be secured on bar 145 at different positions therealong by a clamp jaw 147 and bolt 148.

Figure 3:
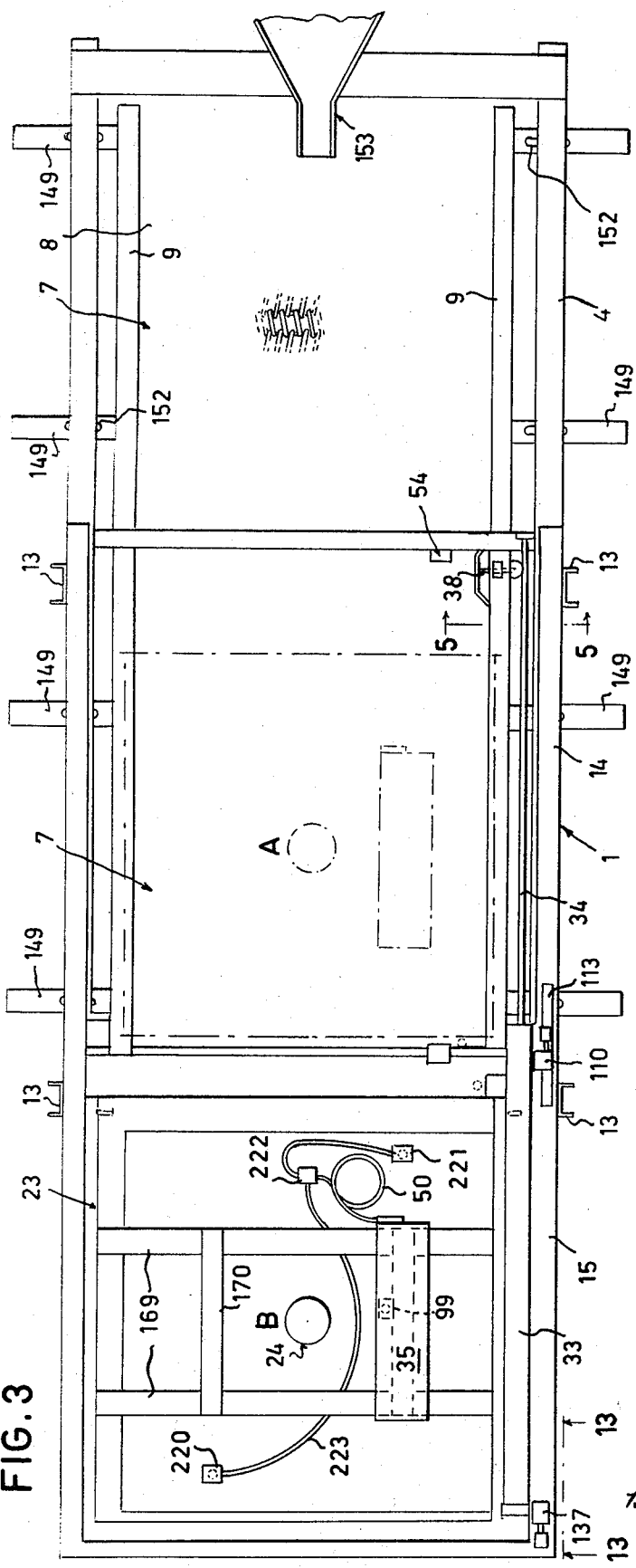
FIG. 3 is a top plan view of FIG. 1 with certain parts semi-diagrammatically indicated.

Spaced below the bar 145 is one of a horizontal row of spaced, parallel, horizontally-extending arms 149, each of which is bolted to a block 150 that, in turn, is bolted against the upper flange of side frame member 4 (FIG. 5) of the stationary frame. A row of said arms is at each of the longitudinally-extending sides of the palletizer (FIG. 3). A bolt 151 extends through a slot 152 in each arm to enable positioning the arms in different degrees of extension of their inner ends over belt 8, said arms extending in directions at right angles to the length of said belt.

The inner ends of the row of arms 149 along each side of the palletizer support a horizontal side rail 9 (FIGS. 3, 5) providing a pair of horizontally-extending parallel rails between which the cans on the belt 8 are confined and which define two of the opposite lateral sides of the group of cans to be lifted by the suction cups. The third side of the group formed on belt 8 is against the pattern forming bar 10, and the fourth side will automatically be formed as the cans from a chute or conveyor 153 (FIG. 3) are fed onto the rear end of the belt 8.

Secured on the side rail 9 that is below valve 54 and bar 145, is an upstanding standard 154 (FIG. 5) having a horizontal pivot 155 at its upper end on which is secured an upwardly-extending arm 156 and a laterally outwardly-projecting arm 157. The arm 38 that is actuated by engagement with one of the cans on the belt 8 is rigid with and depends from the outer end of arm 157.

The upper end of the upwardly-extending arm 156 is opposite valve stem 158 that is adapted to actuate valve 54 when the arm 38 is swung outwardly.

The lower end of arm 38 may be weighted by an enlargement 159 and when no cans are on the belt 8 in a position to actuate the arm 38, this enlargement may rest against the rail 9 adjacent thereto, so that the latter functions as a stop.

Figure 6:
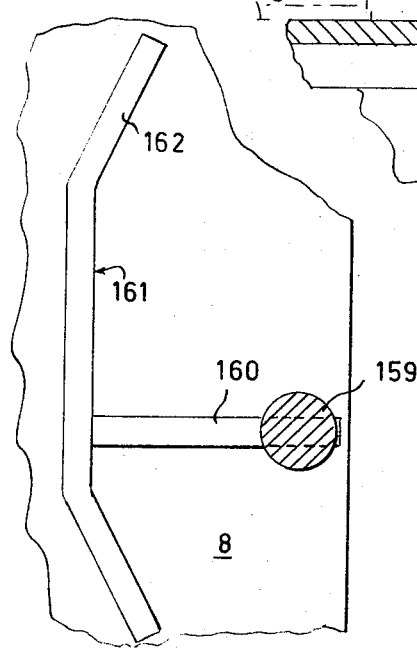
FIG. 6 is an enlarged, fragmentary, cross-sectional view taken along line 6—6 of FIG. 5.

Rigid with arm 38 at its lower end is a horizontally-extending stem 160 that carries a horizontally-elongated bar 161 (FIG. 6) at its inner end positioned over, and extending longitudinally of belt 8.

The opposite end portions 162 of said bar are inclined outwardly toward the adjacent side of the palletizer.

After a complete pattern or layer of cans is formed on belt 8, one of the cans 29, indicated in dot-dash line in FIG. 5 will, under the pressure of oncoming cans, engage the element 159 and swing arm 38 outwardly causing arm 156 to move to the dot-dash position to actuate valve 54, as has hereinbefore been described, so that the cup carrying platen when at station A will move downwardly for connecting the vacuum cups with the upper closed ends of a full layer of cans that are on belt 8 ahead of the can that actuates arm 8 and valve 54.

The cup-carrying platen 28, is shown in FIG. 2 with the cups 26, 26a thereon. The carriage 23 comprises a frame having a pair of parallel, horizontally-elongated side frame members 163 (FIGS. 2, 7) that, in turn, have rollers 164 for supporting the carriage 23 on tracks 20 for horizontal reciprocable movement between the can pick-up station A and the can loading position B (FIGS. 1, 3). Tracks 20 are carried by the upper side frame members 14 of the palletizer frame (FIG. 12) and brackets 165 (FIGS. 7, 12) secured to each of the side frame members carry pairs of rollers 166 at each of the corners of the carriage for engaging opposite lateral sides of the tracks 20 to maintain the carriage against lateral movement and to accurately position the carriage and can engaging suction cups over the cans at the stations A and B.

Hangers or plates 167 respectively support rollers 164 (FIG. 13) and a lower roller 168 is supported for rotation on the lower portion of each hanger, each roller 168 being below track 20 for retaining the carriage on the tracks against tipping.

By the foregoing arrangement, the carriage is held during its movement on tracks 20, and at stations A, B, against lateral, and vertical movement relative to the tracks.

The platen frame 25 includes cross frame members 169 (FIG. 7) that are rigidly secured at their ends to the side frame members 163 and which cross frame members, in turn, are connected by box beams 170, on one of which the housing 35 that encloses many of the control valves is secured.

The platen 28 is shown in FIG. 12, without the suction cups, and is carried by a central rectangular plate 171 (FIGS. 2, 12) that, in turn, is connected by adjustable levelling bolts 172 with a similar plate 173 spaced thereabove, and plate 173 is centrally secured to the lower end of the rod 27 that extends onto the vertical cylinder 24.

Cylinder 24, in turn, is secured at its lower end on an upper horizontal rectangular plate 174, which plate 174 is secured adjacent its corners on levelling bolts 175 between adjusting nuts 176 on said bolts to enable adjusting the cylinder to insure vertical movement of the platen for making a vertical stack of layers of the cans when the palletizer is in operation.

The platen levelling bolts provide means for levelling the platen so that the cups for engaging the cans will be in a plane parallel with the plane of the upper ends of the cans.

Secured to the plate 173 is a laterally projecting arm 179 that extends below the housing (FIG. 12) at its outer end, and a vertical valve actuating rod 180 is adjustably secured to said outer end and projects upwardly therefrom. The valves 99, 106 are supported inside housing 35 in superposed relation and are connected for simultaneous operation by means of a stem projecting from the lower valve 106. This stem is in vertical alignment with the rod 180, hence when the platen is at its maximum elevated position, the rod 180 will have passed through an opening in the bottom of housing 35 and have actuated valves 99, 106 as has hereinbefore been described, for admitting air into the traversing cylinder 33 for moving the carriage between the stations A and B.

Until the platen and its frame are in their uppermost position, the valves 99, 106 will be closed, hence it will be impossible to move the carriage on tracks 20 in either direction, unless the platen is at its maximum elevated position.

It is important that the platen 28, in moving from station A to station B with a layer of cans suspended from the cups 26, 26a, should stop at station B without loosening the cans from their connections with the cups, and this is accomplished by actuation of the valve 110 (FIG. 14) which valve is on the carriage 23. The cam track 113 is on the upper side of a horizontally-elongated cam 181 (FIG. 14) on one of the side frame members 163 and the cam follower 112 that is on the trailing end of the carriage during movement from station A to station B. The cam follower 112 will ride onto cam 181 when the platen is about 6 inches from reaching station B, thus actuating the valve 110 to slow down the movement of the carriage, and rubber bumpers 182 (FIG. 13) will be engaged by brackets 165 that carry rollers 166 when the carriage reaches loading position to further minimize any shock. Each bumper is carried on an adjustable bolt 183 that in turn is adjustably secured to an upstanding member 184 rigid with the end of each track 20. Thus the bumpers provide an accurate stop for the carriage.

The carriage 23 also carries valve 118 (FIG. 13) that is adapted to be actuated upon the carriage 23 reaching the loading position at station B. An adjustable stop 185 in the form of a horizontally disposed member adjustably secured to the forward cross frame member 186 of the stationary frame. This member may be threaded into an opening in said forward cross frame member for securement by a lock nut 187 at the desired degree of projection toward the carriage 23, and when the carriage reaches its forward position at station B the adjustable stop 185 will engage the stem of valve 118 to actuate the latter.

As has previously been noted, valve 119 (FIG. 13) is a manually actuatable valve carried by the carriage, and when the carriage 23 is at station B it is readily accessible to an operator for pressing the button 188 to actuate the valve, and when this is done the platen will be gently lowered at a controlled rate of speed by reason of air being admitted under pressure through valve 119 for passage to and through valve 118 to the control means hereinbefore described for opening the lower end of the elevating cylinder 24 to relatively slow exhaust. Until valve 118 is actuated, this exhaust of air from the lower end of cylinder 24 cannot be effected, hence accidental lowering of the platen during movement from station A to station B is avoided.

It is quite important that the rate of descent of the platen carrying a layer of cans at the loading station should be carefully controlled so there is no shock when the layer of cans is seated on the pallet 30 or on a layer previously deposited on the pallet, and it is also importent that the pallet should be accurately guided during its descent.

A pair of vertical guide strips 190, (FIGS. 2, 12, 14) are secured to the side frame members 163 of the carriage 23 adjacent to the rear ends of said members and the platen frame itself carries a pair of horizontal rollers 191 (FIG. 14) between which each of the guide strips is positioned, said rollers being at the forward and rear sides of said strips. A third inner roller 192, carried by the carriage frame, (FIGS. 12, 14) engages each of the oppositely facing sides of the pair of guide strips 190.

When the carriage is in position B preparatory to lowering a layer of cans onto a pallet, the guide strips 193 are above and in vertical alignment with a longer vertically-extending pair of lower guide strips respectively below and adjacent to guide strips 190. Said guide strips 193 (FIGS. 1, 12, 14) are rigidly secured to the stationary frame of the palletizer.

By the above structure, the platen and its platen frame are accurately guided during the lowering and elevating of the platen.

The pattern forming bar 10 (FIGS. 2, 14, 15) comprises a flat strip 194 (FIGS. 9, 15) supported on and secured to members 195 (FIG. 2) that, in turn, are bolted onto the stationary side frame members. The strip 194 is spaced a small distance above the forward end of the upper run 8 of the conveyor 7 (FIG. 14) and at equally spaced points along its rearwardly facing edge it is formed with shallow arcuate recesses 195' (FIG. 15) that conform to the horizontal cross-sectional, cylindrical contours of the cans 29 that are supported on belt 7.

Blocks 196, equally spaced apart in a horizontal row, are secured on the strip 194 with the blocks between the end blocks of the row equally spaced between recesses 195, one end block being outwardly of one of the end recesses 195'. Blocks 196 equally project rearwardly from the rear edge of the strip 194 and the rearwardly facing end of each block is formed with a recess 197 that corresponds in contour to each recess 195'.

Figure 9:
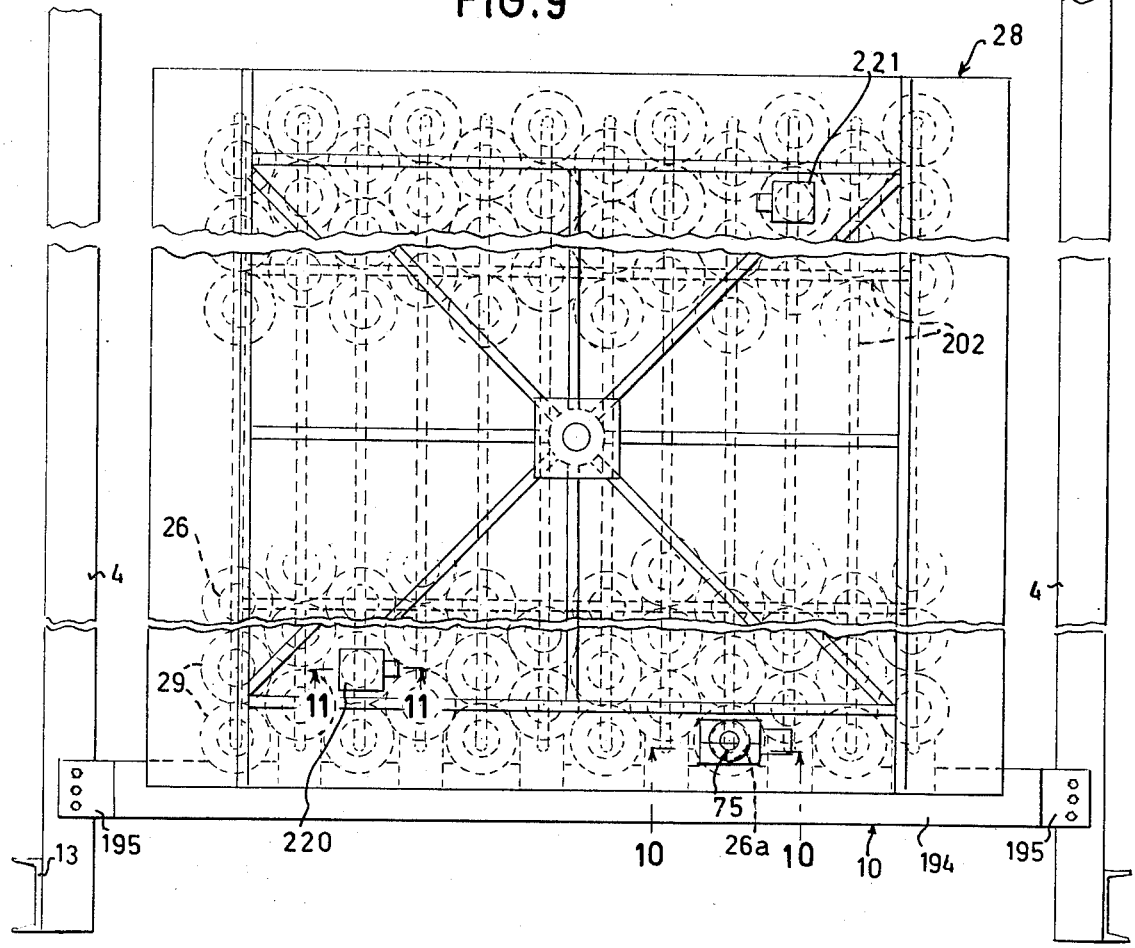
FIG. 9 is a top plan view of the platen separate from the platen-carrying frame, with cans and suction cups indicated in broken lines and with the platen in a position for picking up a layer of cans for carrying it to a pallet.

The spacing between recesses 195' in strip 194 and between the recesses 197, and the positions of recesses 197 relative to recesses 195' are such that when the cans 29 on belt 7 below station A are in adjoining relation and crowded against the pattern-forming bar with the cans along and against the side rails 9 in adjoining relation in a straight row of cans along each rail, a can will be positioned in each of the recesses 195' and 197 and between each adjacent pair of blocks 196. In FIG. 9 the pattern of cans is illustrated when the pallet is at station A, the pattern-forming bar 10 being indicated.

The lower edges of the strip 194 and blocks 196 along recesses 195', 197 are bevelled or chamfered at 198 to preclude the chimes at the lower ends of cans 29 catching thereon upon the layer of cans on belt 7 being elevated.

In FIG. 9 the position of the platen at the pick-up station is indicated in dot-dash lines.

Figure 11:
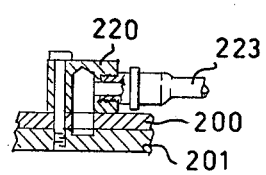
FIG. 11 is an enlarged fragmentary cross-sectional view taken along line 11—11 of FIG. 9.

The platen, itself, comprises a pair of rectangular, flat horizontal plates 200, 201 (FIGS. 10, 11) tightly secured together in face-to-face relation with their outlines in register with each other. Plate 200 is uppermost and the upper surface of the lower plate 201 is formed with upwardly opening grooves 202 providing parallel ducts extending in one direction connected by cross ducts extending in the other direction (FIG. 9).

Plate 201 is formed with passageways 203 (FIG. 10) for threaded fittings 204 for securing the bases 205 of the downwardly opening rubber-like cups 26 tightly against the underside of plate 201. Each fitting 204 is centrally apertured to provide a passageway communicating between a duct 202 and the interior of each cup 26.

Cup 26a corresponds to cups 26, but it is secured by a fitting 206 to the lower end of a vertically-disposed cylindrical member 207 that is vertically reciprocable within a vertical bore 208 of an outer body 209. The lower end of the body 209 is formed with an externally-threaded nipple 210 that, in turn, is threadedly secured in an opening extending through the platen at a position midway between a pair of cups 26.

The member 207 slidably fits within bore 208 at its lower end and is formed with a shoulder within bore 208 against which the lower end of a coil spring 211 is seated, while the upper end of the spring is seated against a restricted portion of bore 208 that also slidably fits the outside of member 207. A fitting 212 is secured to the upper end of member 207 and acts as a stop to limit downward movement of the member and cup 26a under the influence of spring 211.

Fitting 212 is formed with a passageway 213 that is connected by a flexible tube 214 with another fitting 215 that, in turn, is secured on the upper plate 200 of the platen and which fitting is apertured to provide a communication between one of the ducts 202 and passageway 213 through tube 214.

Passageway 213 communicates within fitting 212 with one side of an annular chamber 216 around the upper end of member 207 within fitting 212, and which upper end of sleeve 207 is ported to provide for communication between the chamber 216 and a central passageway 217 in member 207 that opens at its lower end into cup 26a.

The valve 75 is secured on a frame member of the carriage 23, and air line 76 connects with said valve. When the member 207 is elevated by upward movement of a can 29 carried by cup 26a, upon a load of cans being deposited on pallet 30, the valve stem 72 will be engaged and actuated by fitting 212 to break the vacuum in the cups 26, 26a to release the cans.

Figure 7:
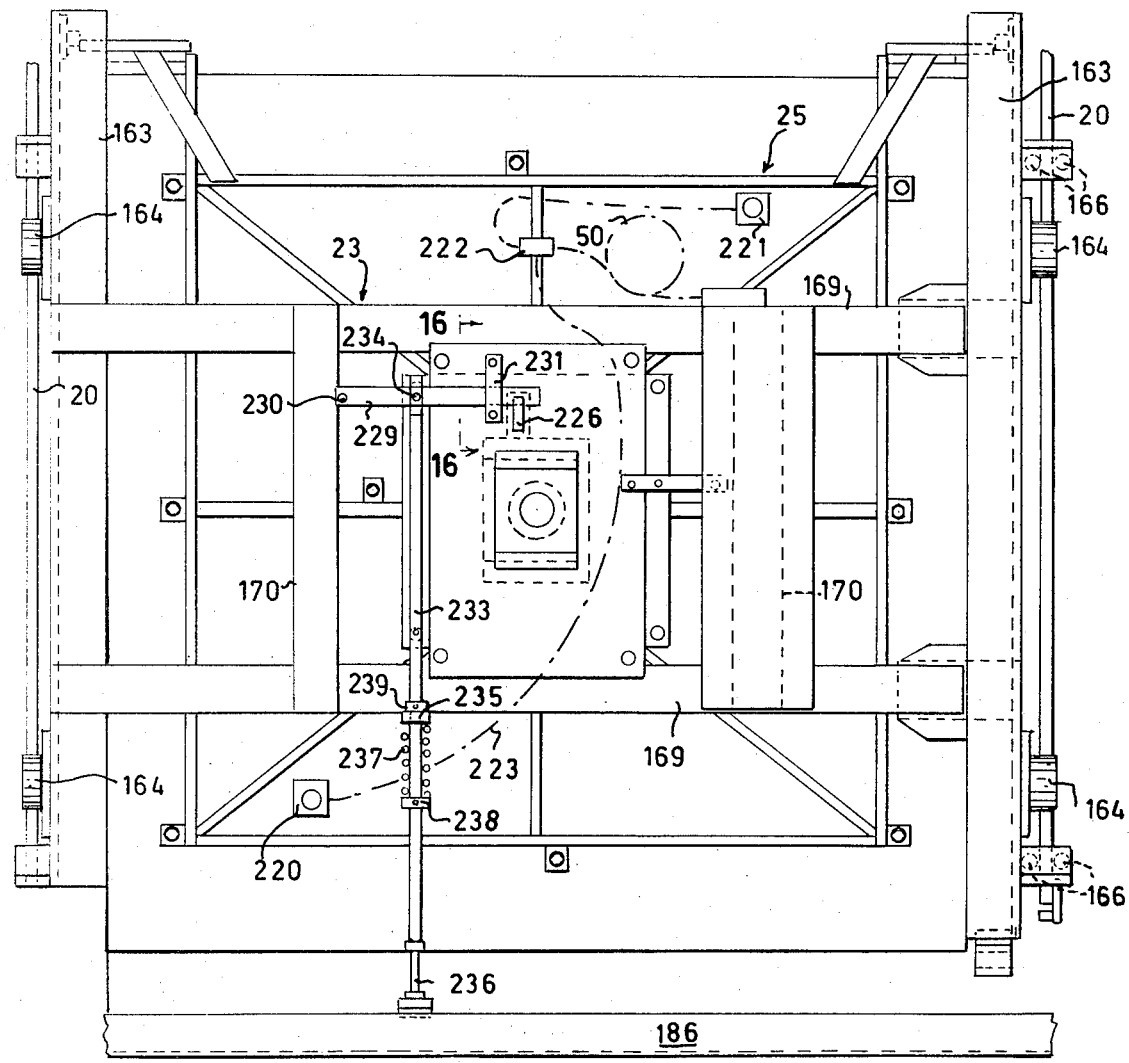
FIG. 7 is an enlarged, somewhat simplified, top plan view of the carriage and the platen-carrying frame, with air lines that would show indicated in dot-dash lines.

Adjacent to diagonally opposite corners of the platen are fittings 220 and 221 that are respectively connected with a manifold 222 (FIGS. 3, 7). Each fitting 220, 221 communicates with one of the air ducts 202 in platen 28 (FIG. 11) and a flexible air line 223 connects fitting 220 with manifold 222, while a similar hose connects fitting 221 with said manifold (FIGS. 3, 7).

Air line 50 (FIGS. 3, 4, 7) connects the manifold 222 with the vacuum valve 49 that is within the housing 35 (FIG. 4).

Vertical movement of the platen at station A must be adequate to lift the cans to clear the layer forming bar 10, and this distance will be the same irrespective of the vertical dimensions of the cans.

Figure 8:
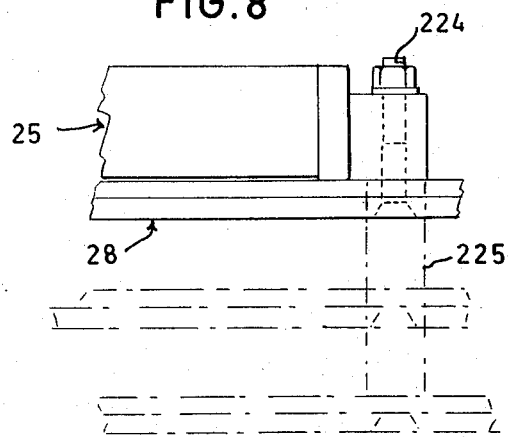
FIG. 8 is an enlarged, fragmentary, elevational view of one corner of the platen and platen-carrying frame.

As seen in FIG. 8, the platen 28 is secured directly to the platen frame 25 by bolts 224 where the largest cans are to be handled, and spacers 225, indicated in dot-dash lines, which may be of different lengths according to the lengths of the cans to be handled, support the platen different distances below the platen frame. The vertical travel of the platen frame will remain the same for the different sized cans.

Rigidly secured to plate 173 of the platen frame is an upstanding latch-engaging post 226 (FIGS. 7, 12, 16) having a laterally projecting tooth 227 (FIG. 16) at its upper end. The upper side of said tooth is bevelled at 228.

One end of a horizontally elongated latch bar 229 is pivotally connected at one end to a vertical pivot 230, which pivot is secured to one of the horizontal box beams 170 that is rigid on the carriage 23. The end of the latch bar 229 that is opposite pivot 230 is adapted to extend below the tooth 227 of the latch-engaging post 226 when the platen frame has moved to the upper end of upward movement.

A bridge piece 231 (FIG. 16) supported at its ends on posts 232 that, in turn, are secured on the plate 174, extend over the outer end portion of said latch bar and said outer end is oscillatable below said bridge piece and between posts 232.

Latch bar 229 is pivotally connected with one end of a horizontally-elongated latch actuating rod 233 (FIG. 7) by a pivot 234 at a point intermediate the ends of said latch bar. The opposite end of rod 233 slidably passes through a guide 235 that is secured to one of the cross frame members 169 of the carriage, and the terminal outer end of rod 233 is adjacent to, but spaced from, the forward cross frame member 186 of the stationary main frame 1. A horizontally-adjustable elongated rod engageable element 236, secured on said main forward cross frame member 186, is in longitudinal alignment with the rod 232.

An expansion coil spring 237 (FIG. 7) around rod 233 reacts between the guide 235 on the cross frame member 169 and a collar 238 secured on said rod 233. The spring 237 reacts between guide 235 and collar 238 fixed on rod 233 to hold rod 233 forward, and the end stop is provided by a second collar 239 (FIG. 7) fixed on rod 233. Collar 229 is held against guide 235, and in this position the latch bar 229 is located below tooth 227 on latch post 226 until the rod 233 is actuated by engagement between rod 233 and element 236.

The height of the tooth 227, relative to the upper run 8 of belt 7, is such that the latch bar 229 will stay below the tooth during descent of the platen to pick up the layer of cans formed against the pattern-forming bar 10 to clear said bar for movement of the platen and cans from station A to station B. Thus the platen with the layer of cans carried thereby cannot accidentally drop below the limit defined by the tooth 227 on the latch post during transit to station B.

Upon reaching station B, the latch bar 229 will be swung from below tooth 227 by the engagement between rod 233 and element 236 to permit the platen and the layer of cans carried thereby to be lowered. As long as the carriage with the platen is at station B, the element 236, by pushing against rod 233, will hold latch bar 229 swung to a position from below tooth 227. This allows the platen to move downwardly to unload the cans, and up again without obstruction from latch bar 229. The latch bar will move under tooth 227 as soon as the carriage starts its return movement from station B to station A. The platen as shown in FIG. 7 is in a position just before the latch bar has been swung to a position from below tooth 227.

The upper run 8 of belt 7 is supported between pulleys 5 on hardwood strips 240 (FIGS. 1, 12) or other suitable rigid supports, on cross members 241 that, in turn, are secured at their ends to stationary side frame members 4.

In operation, the cans to be palletized are fed upright onto the upper run 8 of outer or rear end of belt 7 by any suitable feed means, such as an inclined feed chute 153 or a conveyor. As already mentioned, the belt 7 may be of the well-known woven wire mesh type providing a planar upper surface on which the cans are readily slidable.

The cans fed onto said belt are carried against the pattern-forming bar 10 where a horizontal layer of cans is automatically formed in a pattern that conforms exactly to the pattern of a horizontal layer of vacuum cups carried by a horizontal platen 28, that in turn is supported on a horizontally-reciprocable carriage 23 for horizontal movement on rollers between a station or position A, and a loading station or position 13 (FIG. 1).

The platen carrying the vacuum cups will remain at station A, elevated above the cans, until a full layer of cans of the completed pattern has been formed against the pattern-forming bar 10.

Upon a full layer of cans being formed against bar 10, the platen automatically moves down until the vacuum cups engage the heads of the cans and the latter are gripped by the cups. Means is provided in the system, as has been described, to control the rate of descent of the platen, and to provide sufficient delay of the vacuum cups on the cans to insure the cups having a secure grip on the cans before the platen is raised.

Immediately after the cans are securely gripped by the vacuum cups, the platen is automatically elevated at a controlled rate, and upon reaching a predetermined height sufficient for the cans to clear the pattern-forming bar 10, a valve in the air system is mechanically actuated by the movement of the platen to said elevated position for effecting actuation of an air cylinder to move the platen carriage from station A to station B.

The movement of the platen carriage 23, including the platen from station A to station B is controlled to slow down the movement before the carriage reaches station B and engages a rubber bumper, and accidental dropping of the platen and its load of cans before it reaches station B is mechanically prevented.

Upon reaching station B the platen is released for lowering but is held elevated by air in the air cylinder that elevated it, and said platen is not lowered until a manual release means is actuated by the operator. This provides time for the operator to place a separator sheet on a layer of cans previously deposited on a pallet, or time for removing a loaded pallet and replacing it, or for any other reason.

Upon actuating the manual release, the platen and its load of cans is gently lowered under the weight of the cans and accurate control of the release of air from the platen lifting cylinder.

The control can 26a that is suspended a fraction of an inch below the main body of cans will be the first can to reach the support for the layer and upward movement of said can will actuate a valve in the air system to close the vacuum lines to the cups and to open the lines to a blast of air to free the cups from any tendency to cling to the cans, and to effect a slight delay in elevating the platen and cups from the cans, after which the platen is elevated to its upper position at station B.

The one cup 26a will automatically be lowered by gravity and spring force as the platen moves away from the layer of cans deposited on the pallet, and the actuation of the valve effected by said lowering of the cup 26a will close the blast of air to the cups.

When the platen is at the upper end of its movement, valves will be mechanically actuated by said movement to actuate the air cylinder for returning the carriage 23, and platen 28 back to station A under control by the air. This return movement of the platen is accurately controlled, and at the ends of said movement, the platen is held by air pressure in the horizontal cylinder at either one or the other of said ends, and the air cylinder for raising and lowering the platen cannot be actuated until the platen is in either station A or B.

In the event, however, that the operator may wish to examine the platen and cans between stations A and B a manually-actuated valve is in the air system that enables this to be done.

In the event a full layer of cans is at station A when the platen returns to station A, the cycle will automatically recommence immediately.

I claim:

1. In a can palletizing machine:
   a. a horizontally-elongated, rigid frame and an endless conveyor thereon extending longitudinally thereof for supporting cylindrical cans upright thereon for movement from one end of said conveyor toward the opposite end thereof upon actuating said conveyor for movement, and means connected with said conveyor for actuating the latter for continuous movement for so moving said cans,
   b. feed means for continuously feeding upright cans onto said conveyor adjacent to said one end thereof,
   c. a carriage supported on said frame for movement longitudinally thereof from an elevated position spaced above said conveyor at a can pick-up station at said opposite end of said conveyor to a loading station offset beyond said conveyor, and vice versa, and traversing means connected with said carriage for so moving the latter,
   d. a pattern-former stationary on said frame and positioned over said conveyor at said pick-up station for impeding movement of cans on said conveyor past said pick-up station and for forming the cans on said conveyor into a predetermined pattern of adjoining cans on said conveyor at said pick-up station including surplus adjoining cans between the cans of said pattern and said feed means, under the influence of said movement of said conveyor,
   e. a layer of suction cups corresponding in arrangement to the predetermined pattern of said cans at said pick-up station supported on said carriage for movement therewith longitudinally of said frame, from said elevated position at said pick-up station in vertical register with cans of said predetermined pattern on said conveyor, to said loading station and vice versa,
   f. cup-supporting means on said carriage supporting said layer of cups therein for said movement therewith, and cup-elevating and cup-lowering means on said carriage connected with said cup-supporting means for lowering said cup-supporting means at said pick-up station from said elevated position to a lowered position on the cans of said pattern on said conveyor for engagement of said suction cups with said cans, upon actuation of said cup-lowering means, g. an air system connected with a source of vacuum and a source of air under pressure, and air-actuated means in said system for actuating said cup-lowering means, and means on said frame in said air system actuated for movement of a surplus can on said conveyor under the influence of movement of said conveyor after formation of a complete pattern of cans by said pattern-former for actuating said actuating means for lowering said cup-supporting means to said cans of said pattern for gripping said cans by said cups, h. cup-evacuating means for evacuating said cups for gripping said cans for lifting the latter upon elevating said cup-supporting means to a sufficient height to clear said pattern former, for movement of said carriage, cups, and cans to said loading station, i. control means in said system including a valve on said frame engageable with and actuated by movement of said carriage to said loading station for actuating said cup lowering means from its elevated position at said loading station to a lowered position for depositing cans carried by said cup support onto a can receiving support or onto a previously deposited layer of cans at said loading station, j. a latch engaging element on said cup supporting means movable therewith, and a latch supported on said carriage supported for movement from a position below said latch engaging element mechanically restricting downward movement of said cup supporting means below a predetermined distance during movement of said cup supporting means from said lowered can engaging position at said pick-up station to said elevated position at said loading station, k. latch release means on said frame at said loading station engageable with said latch upon movement of said cup-supporting means and carriage to said loading station for moving said latch out of its position below said latch engaging element to permit lowering said cup-supporting means below said predetermined distance for depositing said cans at different levels, and said engaging element including a latch actuating portion engageable with said latch upon movement of said cup-supporting means from its lowered position at said loading station to its elevated position to automatically re-position said latch below said latch element.

2. In a can palletizing machine as defined in claim 1;

l. means supporting one only of the cups on said cup-supporting means for movement by gravity from an upper position even with the other cups on said cup support to a depending position depending a relatively short distance below the level of said other cups, and vice versa, m. said cup evacuating means including an air line in said system connecting said cups with said source of air under pressure and with said source of vacuum, n. said control system including a mechanically actuated valve on said cup-supporting means stationary relative to said one cup, and means movable with said one cup from its depending position with a can attached thereto to its upper position upon the cans carried by said cup-supporting means being deposited on a can support at said loading station, into engagement with said valve for actuating said valve for connecting said cups with said source of air under pressure for effecting release of said cans, and for actuating said cup lowering means for elevating said cup-supporting means back to its elevated position at said loading station with said latch positioned below said latch element.

3. In a can palletizer that includes a stationary frame, a conveyor having a can-supporting surface continuously movable in one direction for carrying cans thereon to a pattern former stationarily positioned on said frame over said conveyor at a pick-up station at said former for forming said cans from a supply thereof on said surface in successive co-planar layers of a uniform pattern at said pick-up station; a carriage movable on said frame from an elevated position at said pick-up station spaced above said pattern former to a loading position longitudinally offset from said pick-up position and vice versa; a cup-support on said carriage movable therewith and supported thereon for vertical reciprocable movement between an elevated position at said pick-up station and at said loading station and a lowered position at each station, a layer of suction cups on said cup-support in a pattern corresponding to the uniform pattern of cans formed on said conveyor at said pick-up station and in a position for engaging and gripping the layer of cans at said pick-up station upon movement of said cup-support from said elevated position at said pick-up station to a lowered position, and upon evacuation of air from said cups;

a. air-actuated cup-support means connected with said cup-support for supporting said cup-support with said cups depending therefrom for movement from said elevated position to said lowered position at said pick-up station in suction engagement of said cups with the cans of a completed pattern on said conveyor, and for elevating said cup-support from said lowered position with the cans of said pattern held to said cups by suction back to said elevated position at said pick-up station, and for lowering said cup-support and the cans so depending therefrom to said lowered position at said loading station for release of said cans on a pallet or previously released layer of cans at said loading station, and for elevating said cup-support from said lowered position to said elevated position at said loading station after the release of the cans from said cups, b. air-actuated carriage-moving means connected with said carriage for moving said carriage and said cup-support from said elevated position at said pick-up station to said elevated position at said loading station and vice versa, c. a pneumatic system including a source of air under pressure and a source of vacuum and air lines connecting said source of air under pressure with said cup-support actuating means and with said cups and air lines connecting said cups with said source of vacuum, d. control means in said system including first main valve mechanically actuated by cans on said conveyor after formation of each complete pattern of cans at said pick-up station and air actuated valves in said system some of which are actuated by actuation of said main valve for actuating said cup-support means for lowering the latter from said elevated position at said pick-up station and for connecting said cups with said source of vacuum upon engagement of said cups with the cans of said pattern for gripping said cans by suction and for elevating said cup-support and cans to said elevated position at said pick-up station, e. said control means further including a second mechanically actuated valve means mechanically actuated by engagement with a portion of said cup-support upon movement of said cup-support to said elevated position at said pick-up station for effecting actuation of said carriage-moving means for movement thereof from said last mentioned elevated position to said elevated position at said loading station, f. a third main valve in said pneumatic system on said frame at said loading station mechanically actuated upon engagement with a portion of said carriage upon the latter reaching said elevated position at said loading station for effecting progressive stopping of said carriage at said elevated position at said loading station, g. a manually actuatable valve in said pneumatic system for actuation of said cup-support actuating means for lowering said cup-support and cans depending therefrom from said elevated position to said lowered position at said loading station, h. means on said cup-support for suspending one of the cups thereon in a position depending below the other cups on said support and for upward movement of said one cup to the same level as the other cups upon the can on said one cup engaging a pallet or previously positioned layer of cans during downward movement of said support and a fourth main valve in said pneumatic system mechanically actuated by movement of said one cup to the level of the other cups at said loading station and air actuated valves in said pneumatic system actuated by said actuation of said fourth main valve for connecting said cups with a pressure line for releasing said cups and for actuating said cup-support actuating means for moving said cup-support back to said elevated position at said loading station, i. said means, including said second mechanically actuated valve, actuatable upon engagement therewith of said portion of said second mechanically actuatable valve upon movement of said cup-support from said lowered position to said elevated position at said loading station for actuating said carriage-moving means for automatically moving said carriage to said elevated position at said pick-up station, j. said control means including the valves in said pneumatic system air actuated or mechanically actuated independent of an electrical circuit and electrically actuated means.

* * * * *